(12) United States Patent
Avery

(10) Patent No.: US 11,796,422 B2
(45) Date of Patent: Oct. 24, 2023

(54) ENGINE TESTING SYSTEM AND PROCESS

(71) Applicant: Textron Innovations, Inc., Providence, RI (US)

(72) Inventor: Billy David Avery, Wichita, KS (US)

(73) Assignee: Textron Innovations, Inc., Providence, RI (US)

(*) Notice: Subject to any disclaimer, the term of this patent is extended or adjusted under 35 U.S.C. 154(b) by 0 days.

(21) Appl. No.: 17/837,612

(22) Filed: Jun. 10, 2022

(65) Prior Publication Data

US 2022/0307942 A1    Sep. 29, 2022

Related U.S. Application Data

(63) Continuation of application No. 16/874,915, filed on May 15, 2020, now Pat. No. 11,486,795.

(60) Provisional application No. 62/848,884, filed on May 16, 2019.

(51) Int. Cl.
| | | |
|---|---|---|
| *G01M 15/14* | (2006.01) | |
| *B64D 31/00* | (2006.01) | |
| *B64F 5/60* | (2017.01) | |
| *G01M 15/02* | (2006.01) | |

(52) U.S. Cl.
CPC ............ *G01M 15/14* (2013.01); *B64D 31/00* (2013.01); *B64F 5/60* (2017.01); *G01M 15/02* (2013.01)

(58) Field of Classification Search
CPC ...... G01M 15/14; G01M 15/02; B64D 31/00; B64D 2221/00; B64D 31/14; B64F 5/60; B64F 1/34; B64F 1/28; Y02T 50/80
See application file for complete search history.

(56) References Cited

U.S. PATENT DOCUMENTS

| | | | |
|---|---|---|---|
| 3,591,843 A | 7/1971 | Friedrich | |
| 5,260,874 A * | 11/1993 | Berner | G09B 9/24 434/242 |
| 9,200,983 B2 | 12/2015 | Brostmeyer | |
| 10,964,130 B1 * | 3/2021 | Dixit | G05B 23/0283 |
| 2006/0085102 A1 * | 4/2006 | Doel | G05B 23/0232 701/4 |
| 2009/0132111 A1 * | 5/2009 | Macchia | G06Q 10/06 701/31.4 |
| 2014/0366657 A1 * | 12/2014 | Helle | B64F 5/60 73/865.8 |
| 2015/0330869 A1 * | 11/2015 | Ziarno | G01M 15/14 701/34.4 |
| 2016/0086396 A1 * | 3/2016 | Nutaro | G07C 5/0808 701/29.4 |
| 2017/0259942 A1 * | 9/2017 | Ziarno | G05B 23/0283 |
| 2019/0087789 A1 * | 3/2019 | Barkat | G06Q 10/06316 |
| 2019/0120720 A1 * | 4/2019 | Fernando | G01M 15/14 |
| 2019/0222298 A1 * | 7/2019 | Abeel | G08G 5/0021 |
| 2019/0293045 A1 * | 9/2019 | Hunt | F02P 7/067 |

FOREIGN PATENT DOCUMENTS

EP    1288644 B1    3/2007

* cited by examiner

*Primary Examiner* — Mussa A Shaawat
(74) *Attorney, Agent, or Firm* — Avek IP, LLC

(57) ABSTRACT

Disclosed are systems and methods for testing aircraft engine that are not currently associated with a functional aircraft or systems. For testing, systems on the engine being tested are connected with the reciprocating systems (e.g., engine electronic controls, main and motive fuel) on a fully functional aircraft using conduits that have been extended to lengths enabling the connection.

16 Claims, 3 Drawing Sheets

ENGINE TESTING SYSTEM AND PROCESS

RELATED APPLICATIONS

This application is a continuation of U.S. patent application Ser. No. 16/874,915, filed May 15, 2020, which claims the benefit of U.S. Provisional Patent Application No. 62/848,884 filed May 16, 2019, the entire contents of which are herein incorporated by reference.

BACKGROUND

1. Technical Field

The disclosed systems and methods relate to the testing of aircraft engine systems that require engine functionality.

2. Discussion of Related Art

Testing methods for turbine engines are known. None U.S. Pat. No. 9,200,983 to Brostmeyer discloses a system and process for testing a gas turbine engine that uses a large compressed air storage reservoir to provide compressed air to the testing system. U.S. Pat. No. 3,591,843 to Friedrich discloses cross-coupling between engines to permit starting one engine by another and driving auxiliary equipment via gear means. Friedrich also discloses the use of friction clutches to permit testing of engines and auxiliary equipment. European Patent No. EP1288644 to Humerickhouse discloses a system and method for evaluating faults detected during testing of a gas turbine engine. Humerickhouse compares current engine data to prior engine data and performs statistical analysis of several engine performance parameters for improved diagnosing of engine faults.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

Disclosed is a system for testing an engine. The system includes an electrical engine control line where the first end is configured for receipt into an onboard aircraft electronic control system of a first aircraft, the electronic control system having a functional electronic support system for a first engine on the first aircraft; the second end of the at least one electrical engine control line being configured for receipt into a local electronic control system at or on a second engine being tested; and the length of the at least one electrical engine control line being extended to reach between the first and second aircraft engines. In embodiments, the second aircraft engine is located on a second aircraft, and the at least one electrical engine control line extends between the first aircraft and the second aircraft. In embodiments, the engine control line comprises two redundant electronic control lines, e.g., including both power and signaling conduits.

The signaling conduits, in embodiments, upon a connection made between the onboard electronic control system of the first aircraft and the second engine being tested, enabling throttle controls on the first aircraft to operate the second engine during the test. The engine control line can connect the onboard electronic control system of the first aircraft to communicate with a FADEC system on the second engine in embodiments.

In embodiments, the system includes a fuel conduit; a first end of the fuel conduit configured to connect into a fuel providing subsystem of the first engine; a second end of the fuel conduit configured to connect into a fuel receiving system on the second engine; and the conduit is elongated to an extent enabling interconnection between the functional first aircraft systems and the second engine. The fuel conduit may include both motive and main fuel lines. In embodiments, the electrical control line and fuel conduit both include connectors on each end for mating with existing reciprocating connectors on each of the onboard aircraft electronic control system of a first aircraft.

Alternatively, a system for operating an aircraft engine includes a fuel conduit whose first end is configured to connect into an engine fuel delivery system existing on a first aircraft. A second end of the fuel conduit configured to connect into an engine fuel intake on an aircraft engine being tested (where the aircraft engine being tested not being associated with the first aircraft). To accomplish this, the conduit is elongated to an extent enabling interconnection between the engine fuel delivery system on the first aircraft and the engine being tested.

In embodiments, the fuel conduit is a main fuel conduit, and the system further includes a motive fuel conduit, the motive fuel conduit configured on a first end to be coupled into a motive fuel output included in the engine fuel delivery system on the first aircraft, the motive fuel conduit configured on a second end to be coupled to an aircraft motive fuel intake on the engine being tested; and the main and motive fuel conduits are bound together along at least a portion of a length of the conduits. In embodiments, the electrical engine control line having first and second ends; the first end of the electrical engine control line being configured for receipt into an onboard aircraft electronic control system on the first aircraft; the second end of the electrical engine control line being configured for receipt into a local engine control system on the engine being tested; and a length of the electrical control line being extended to reach between the first aircraft and the engine being tested. In embodiments, the fuel conduit and electrical control lines have substantially equal lengths, and is further embodiments still, the fuel conduit and electrical control lines are included in a kit.

Alternatively, a method of testing an aircraft engine is disclosed where the engine subject to test exists in an environment lacking full functional support from at least one onboard aircraft system. The method includes the steps of connecting at least one local engine system on the engine to be tested with at least one functional reciprocating system on a master aircraft, and then operating the engine using the at least one functional reciprocating system. The method can involve accomplishing the connecting step by extending a conduit from the local engine system to the functional reciprocating system on the master aircraft. The method can involve selecting a fuel delivery system as the functional reciprocating system, and a fuel receiving system as the local engine system. The method can also involve selecting a main fuel supply system as the fuel delivery system, and a main fuel supply receiving system as the fuel receiving system. The method can also involve selecting a motive fuel supply system as the fuel delivery system, and a motive fuel supply receiving system as the fuel receiving system.

In embodiments, the method includes selecting an onboard electronic engine control arrangement and main and motive fuel delivery systems as the at least one functional reciprocating system on a master aircraft; connecting the onboard electronic engine control arrangement on the master aircraft with a local electronic control system on the engine to be tested; and connecting the main and motive fuel delivery systems on the master aircraft into main and motive fuel receiving systems on the engine to be tested.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions, objects and features may be exaggerated for clarity.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
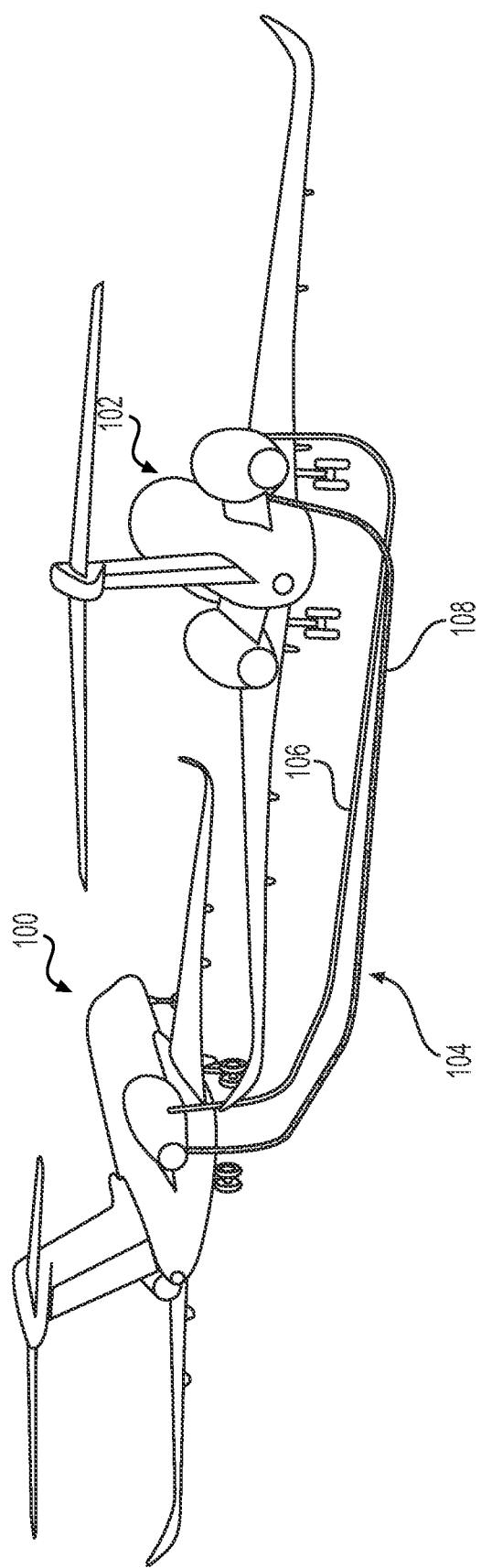
FIG. 1 shows a perspective view showing two aircraft tethered using umbilical lines according to the principles disclosed herein.

The disclosed systems and methods are directed to enabling the full testing of an out of service engine using the onboard systems of another aircraft. As can be seen in FIG. 1, two aircraft 100 and 102 are connected by a plurality of system connecting conduits 104. The conduits include an electrical conduit 106 as well as a fuel conduit 108. Electrical wiring harnesses are an integral part of today's aircraft. Used for signal, power and communication interconnects, harnesses can be found on gas turbine engines, nacelles, and airframe fuselages. With modern airliners relying on fly-by-wire technologies, the harnesses connecting the aircraft's flight components are used to accomplish power and control objectives.

The arrangements used are often referred to as wire bundles. These bundles are constructed of numerous separate wires all having different signaling, power, or other related functions. Each wire has an independent or redundant purpose, and are normally independently jacketed. The jacketing is configured to protect the wires against water, oils, grease, and other things existent in the turbine environment. Due to extreme heat and other environmental reasons, the wiring harnesses must be configured to endure extreme heat. The harnesses are also designed to have a degree of flexibility enabling them to endure bending and afford freedom in routing and attachment.

With respect to the lengthened electrical conduits used herein, the harnesses utilized in the testing arrangement described herein may either have an open or closed bundle arrangement. It is preferred, however, to utilize a common jacket in embodiments to maintain orderly implementation and avoid corruption of individual wires. The harness arrangements utilized herein may also include single or multiple branch cables. In embodiments, the electrical conduit arrangement 106 utilized herein can be an AES wire bundle pair.

Conventional fuel systems use two separate conduits to deliver both main and motive fuel to the engine. Thus, the onboard fuel delivery systems on the aircraft already possess connectors adapted to receive main and motive fuel lines used to support the adjacent aircraft engine.

Figure 2:
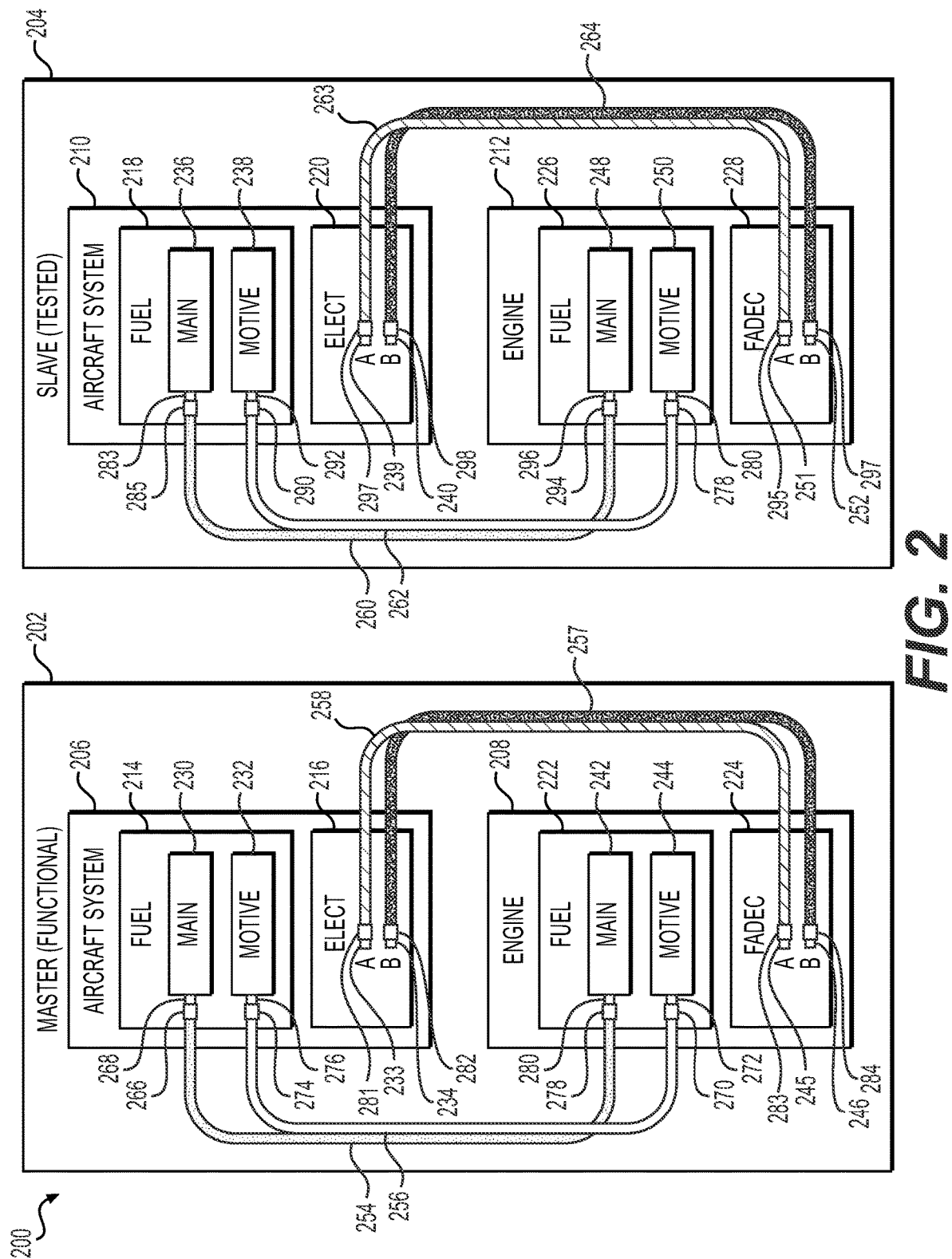
FIG. 2 shows a schematic representation of aircraft systems as existing prior to the implementation of the engine-testing process.

FIG. 2 is provided to show an environment in which the systems and methods disclosed herein might be implemented. A schematic diagram 200 is shown for two different aircraft systems. A first system 202 is that of a system that will be implemented as a master during the test. Subsystem 202 is substantially fully functional in all aspects. Here, it's functionality will be utilized for the testing of a second aircraft system 204 for a second aircraft. The second aircraft, in embodiments, is not fully functional, but even so, needs to be tested so that it can be determined that it meets standards, e.g., in order to meet certification or other requirements. Those skilled in the art will recognize that engines are normally required to be periodically certified in order to meet uextendible deadlines. The testing requires full functionality. Example where the systems and methods herein might be employed are where: (i) the slave aircraft including systems 204 has been damaged, and the fuel and/or electronic systems have been disabled in some respect, (ii) the second aircraft is at an incomplete stage in manufacture, testing is required to maintain certifications, (iii) where an engine is preserved out of service. Regulations require testing of engines which are out of service for a given amount of time. For example, most may need to be run every 30 days, or for some particular minimum amount of out-of-service time. Thus, the processes described herein can be used to operate an out-of-service engine in order to avoid the engine falling outside the minimum period of time between operations. Additionally, these processes enable an out-of-service engine to be tested in order to determine whether it meets specifications.

Referring to FIG. 2, system 202 for the fully functional master aircraft includes aircraft body systems 206 and engine systems 208 for at least one engine on the aircraft. Similarly, the slave aircraft 204 includes aircraft body systems 210 and engine systems 212. Included in the aircraft systems for the master 206, there are fuel systems 214 and electrical control systems 216. Similarly, slave aircraft 204 has fuel 218 and electrical control 220 systems 218 and 220 as well.

Each aircraft has corresponding systems in the engines that cooperate with the systems in the body of the aircraft. For example, for aircraft 202, master engine 208 includes fuel consuming systems 222, as well as a Full Authority Digital Engine Control (FADEC) system 224, each of which will be coupled to fuel distribution system 214 and electronics system 216 on the aircraft, respectively. Similarly, for slave aircraft 204, engine 208 includes fuel receiving systems 226, as well as a FADEC system 228, each of which will be coupled to fuel system 218 and electronics system 220 on aircraft 204, respectively using engine control line conduits, e.g., wire harnesses. As is known to those skilled in the art, the wire harnesses not only provide electrical power to the FADEC, but also provide conduits for signaling, e.g., relating ignition and throttle commands, etc.

In master aircraft 202, the fuel distribution system 214 includes both a main fuel flow out port 230 and a motive fuel out port 232. The electrical controls 216 include dual electrical connectors 233 and 234, one for an A channel, and the other for a redundant FADEC channel B, each of which receives a reciprocating connector 281 and 282. Similarly, in the tested aircraft 204, the fuel distribution system 218 includes both a main fuel flow out port 236 and a motive fuel out port 238. The electrical controls 220 include dual electrical connectors 240 which is used to receive a reciprocating connector 298.

The fuel consuming system 222 of engine 208 for master aircraft 202 has receiving ports, namely a main fuel receiving port 242 and a motive receiving port 244. The FADEC system 224 has dual electrical connectors 245 and 246. Similarly, in the engine 212, the fuel consuming system 226 a main fuel receiving port 248 and a motive receiving port 250. The FADEC system 228 has dual electrical connectors 251 and 252 (for A and B sides).

In normal operation, the fuel and electrical connections are all made using local cables. For example, a main fuel conduit 254 interconnects the main flow out port 230 and the main in flow port 242 on the engine fuel system 222. To do this, a connector 266 on one end of conduit 254 is fastened into a reciprocating connector 268 on the out port 230 to make a connection. At the engine 208, the other end of the conduit 254 has a coupler 280 which is secured into a reciprocating coupler/connector 278 on the intake port 242 for main fuel. A motive fuel conduit 256 has a first end connector 274 that is received into reciprocating coupler 276 on the motive out port 232. At the other end of conduit 256, a coupler 270 is received into a reciprocating coupler 272 existing on the motive fuel intake port 250.

The electrical connections between the aircraft systems 216 and the FADEC 224 are made using an electrical multiwire cable (harness) having A and B channel conduits 257 and 258, respectively. These conduits are connected at one end using a connectors 281 and 282 that are adapted to be received into the FADEC electrical connecter 233 and 234. At the other end of the wire harness, the conduit 257 has a connector 283 that is adapted for receipt into the FADEC coupler 245, and cable 258 has a connecter 284 that is adapted for receipt into the FADEC coupler 246.

Similar arrangements exist in the aircraft to be tested 204, where a main fuel conduit 260 interconnects the main flow out port 236 on the aircraft body 210 and the main in flow port 248 on the engine fuel system 226. To do this, a connector 285 on one end of conduit 260 is fastened into a reciprocating connector 283 on the main fuel out port 236 to make a connection. At the engine 212, the other end of the conduit 260 has a coupler 294 which is secured into a reciprocating coupler/connector 296 on the intake port 248 for main fuel. A motive fuel conduit 262 has a first end connector 290 that is received into reciprocating coupler 292 on the motive out port 238. At the other end of conduit 262, a coupler 294 is received into a reciprocating coupler 296 existing on the motive fuel intake port 250.

The electrical connections between the aircraft systems 220 and the FADEC 228 are made using an electrical multiwire cable (harness) having A-side 263 and B-side 264 conduits. A-side conduit 263 is connected at one end using a connector 297 which is adapted to be received into reciprocating electrical connector 239 on the aircraft electrical system 220. The same end of B-side conduit 264 is connected into B-side electronics connector 240 via a connector 298. At the FADEC 228, the opposite ends of each of conduits 263 and 264 are connected into A and B side FADEC connectors 251 and 252 using connectors 295 and 297, each of which is adapted to conform to the required connector type.

It should be noted that the aircraft engine 212 intended for testing might not have some or any of fuel conduits 260, 262 or FADEC cables 263 and 264 installed as shown to begin the process. Or all of the cables can be initially connected as shown in FIG. 2. FIG. 2 does, however, show one embodiment for a system environment which might exist before implementation of the disclosed processes.

Figure 3:
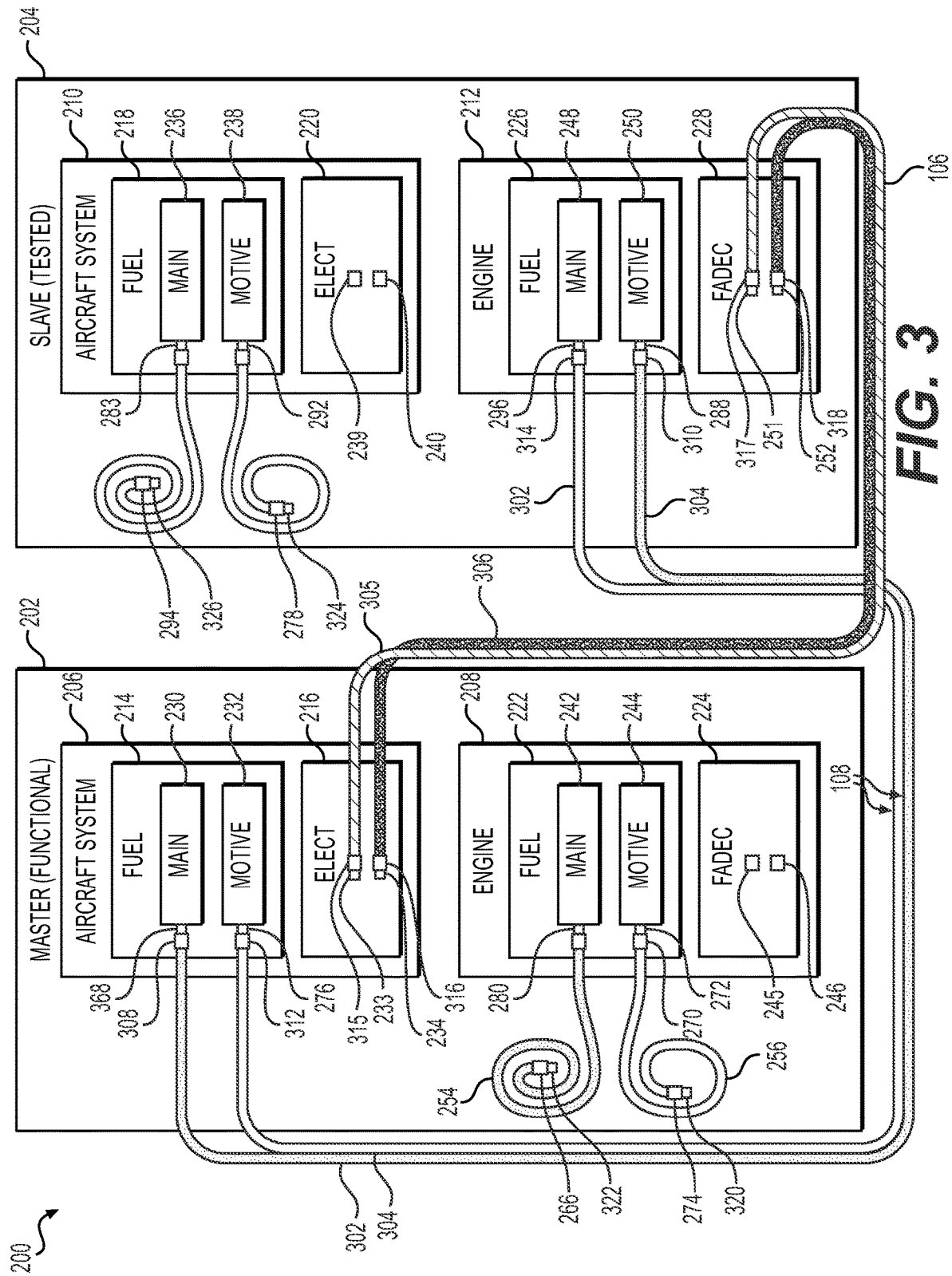
FIG. 3 shows a schematic representation of aircraft systems modified for the purpose of testing according to the disclosed engine-testing processes.

FIG. 3 discloses a schematic for an embodiment where an umbilical arrangement is set up for the purpose of testing an engine on the slave aircraft 100. Referring to the figure, it can be seen that line 108 is run between the master and slave fuel systems, 214 and 218. Line 108, in the disclosed embodiment, includes main and motive fuel conduits, 302 and 304. The two conduits are integrated/joined together longitudinally to create the single aggregated fuel delivery arrangement 108 seen in FIG. 1. The fuel delivery arrangement 108 is made to be long enough to reach between the master and slave aircraft 102 and 100, respectively, so that the master systems can be used as a substitute for the slave systems. At the master coupling end of the fuel line 108, a connector 308 is configured to be fastened to the main fuel connector 268 for the main fuel outlet 230 for the master aircraft. The other end of conduit 302 is connected into the main and motive fuel intake ports 248 and 250 of the tested aircraft engine 212. The connection for the main conduit 302 is made possible using a connector 314 configured to be received into the main fuel intake connector 296. The connection for the motive conduit 304 is made using a connector 310 configured to be coupled to the motive fuel intake port connector 280.

FIG. 3 also reveals test connection being made between the master aircraft electronic systems 216 and the test aircraft FADEC 228. More specifically, an elongated AES wire bundle 106 includes an A-side conduit 305 and a B-side conduit 306. At a first end of A-side and B-side conduits 305 and 306, respectively, an A-side coupler 315 (see FIG. 3) and a B-side coupler 316 are each configured for receipt onto corresponding A-side and B-side electronics connector 233 and 234, respectively, both existing on the electrical systems 216 for the master aircraft. At the other end of each of A-side and B-side conduits 305 and 306 are connectors 317 and 318, respectively. Connectors 317 and 318 are each configured for receipt by the A-side FADEC connector 251 and B-side FADEC connector 252. The wire bundle 106 is configured to be long enough to reach from aircraft to aircraft as shown in FIG. 1. In the disclosed embodiment, the conduits 305 and 306 are mostly joined together except at the ends where the conduits split to meet the necessary connections on each side.

The implementation of the aggregated fuel line 108 along with the elongated electrical bundle 106 (see FIG. 1) enable the slave aircraft, even if it has FADEC or fuel systems that are damaged, not yet operational, or somehow otherwise unavailable, to operate just like it has onboard systems that were operating.

In terms of a more detailed process, as a first step the aircraft are prepared in the proper locations with chocks installed, and parking brakes set. Depending on the condition or damage to the airframe of slave aircraft 100, it may be necessary to use an external source for brake hydraulic pressure or other means to secure the aircraft.

Next, the master aircraft 102 fuel systems are reconfigured. More specifically, the engine motive flow fuel delivery hose 256 connector 274 is disconnected from the aircraft motive flow connector 276 at the end of the interface tube 232 leading to the aircraft fuel delivery systems. The now open end connector 274 of the hose 256 is then plugged using a temporary plug 320 which is installed into connector 274 to close off hose 256 (See FIG. 3). This will prevent back flow of fuel from the master engine motive fuel receiving tube 242. The coupler 312 associated with the motive flow conduit 304 of the extended-length test hose is then connected to the now-open motive delivery tube connector 276.

Next, the connector 266 of the existing main supply hose 254 (see FIG. 2) is disconnected from the connector 268 of the main supply aircraft (e.g., at the main fuel supply tube 230), and the open end of hose 254 temporarily plugged using a plug 322 to prevent back flow out of the engine main fuel tube 242. Then the coupler 308 on the aggregated elongated fuel line 108 associated with the main supply conduit side 302 is connected in to the connector 268 on the main fuel supply port 230.

Next, the master aircraft electrical systems are reconfigured. More specifically, A and B side connectors 281 and 282 of the aircraft side of the master aircraft electrical bundle 258 are removed from reciprocating couplers 233 and 234 at the aircraft electrical systems outlets, and the A and B side connectors 315 and 316 (see FIG. 3) on the one end of the extension harness 306 connected in where the others had been (as shown in FIG. 3).

The slave fuel systems are then reconfigured. With respect to the systems 204 of the slave aircraft 106, first the motive flow hose 262 is disconnected from the engine input tube 280 by disengaging hose coupler 278 from the connector 280 on the motive fuel tube 250. Then, a plug 324 is installed into connector 278 to seal off any fuel coming out of tube 236. Then, now that connector 280 on the motive fuel entry is open, a connector 310 at an end of the greatly extended motive conduit 304 is coupled thereto. This completes a circuit for motive flow from the functional motive fuel source 216 to the slave aircraft motive fuel intake 250.

Then, the engine connector 278 on the main hose 260 is disconnected from connector 296 on the main fuel engine intake source tube 248, and a plug 324 then fastened in to the connector 278. Next, the coupler 314 on the main fuel greatly extended conduit 302 is connected on to the coupler 280 on the main fuel intake 248 for the slave aircraft engine. This completes a circuit for main fuel flow from the functional main fuel outlet tube 230 of the master aircraft to the main fuel intake 248 of the slave aircraft.

Now that the fuel systems for the slave aircraft have been set up for testing, the electrical connection can be made. To do so, the A and B side electrical connectors 295 and 297 are each disconnected form the reciprocating connectors 251 and 252 at the interface for engine FADEC 228 for the slave aircraft. Then, the A and B side couplers 317 and 318 on the loose end of extended-length electrical connector 106 are connected into the now open reciprocating connectors 251 and 252 at the interface for engine FADEC 228. This completes a full connection between the master aircraft electronics 216 and the slave aircraft FADEC 228.

A preliminary to starting any testing, it may be necessary to disable or cap airframe systems on the aircraft to be tested (slave) that may be incomplete or damaged such as pumps, generators and bleed air supply. In certain arrangements, it may be necessary to use bleed air from the master aircraft fuel system for the benefit of the slave aircraft fuel system, e.g., by arranging an air conduit bundled along with the extended main fuel conduit 302 in the aggregated line 108, and then using the bleed air at the slave aircraft. Or, in embodiments, the bleed-air line could be a separate elongated line.

In some arrangements where an engine-derived starter air source is required for engine operation, the starter air could be provided to the slave by the master using a separate elongated starter-air line, or perhaps a line that is aggregated with one of the two lines 106 or 108. The starter air source could alternatively be provided by a cart locally at the slave, and the master aircraft not involved in starter air delivery.

Similarly, electrical power necessary for startup can be derived from the master aircraft via an elongated electrical cable connected between the master aircraft source and the slave engine. Alternatively, starter power can be provided to the slave engine by a cart or another electrical power source not associated with the master aircraft During engine testing the master aircraft fuel system, including plumbing, tanks and pumps, supplies the fuel necessary for engine operation. Because the engine FADEC has been linked to the fully functional engine-related electronic controls of the master, the cockpit of the master aircraft initiates the starting of the engines on the slave, maintains throttle control and displays all engine instruments as if the engines were actually on the master itself.

In some embodiments, the aggregated elongated fuel line 108 (including both main and motive fuel conduits) and elongated engine electronics bundle 106 could be included together in a kit, optionally along with other articles (e.g., plugs 320, 322, 324, and 326) helpful in arranging the systems as disclosed in FIG. 3, and otherwise discussed herein. The kit could also include instructions for the purpose of executing the test.

While the present disclosure has shown and described exemplary embodiments, it will be understood by those of ordinary skill in the art that various changes in form and details may be made therein without departing from the spirit and scope of the present disclosure, as defined by the following claims.

What is claimed is:

1. A system for operating an aircraft engine, the system comprising:
    a main fuel conduit;
    a first end of a main fuel conduit configured to connect into an engine fuel delivery system existing on a first aircraft;
    a second end of the main fuel conduit configured to connect into an engine fuel intake on an aircraft engine being tested, the aircraft engine being tested not being associated with the first aircraft;

the main fuel conduit being elongated to interconnect the engine fuel delivery system on the first aircraft and the aircraft engine being tested;

a motive fuel conduit, the motive fuel conduit configured on a first end to be coupled into a motive fuel output included in the engine fuel delivery system on the first aircraft, the motive fuel conduit configured on a second end to be coupled to an aircraft motive fuel intake on the engine being tested; and the main and motive fuel conduits being configured to extend between the engine on the first aircraft and the aircraft engine being tested.

2. The system of claim 1 wherein the main and motive fuel conduits are bound together along at least a portion of a length of each of the main and motive fuel conduits.

3. A system for operating an aircraft engine, the system comprising:

a fuel conduit;

a first end of the fuel conduit configured to connect into an engine fuel delivery system existing on a first aircraft;

a second end of the fuel conduit configured to connect into an engine fuel intake on an aircraft engine being tested, the aircraft engine being tested not being associated with the first aircraft;

the conduit being elongated to interconnect the engine fuel delivery system on the first aircraft and the aircraft engine being tested;

an electrical engine control line having first and second ends;

the first end of the electrical engine control line being configured for receipt into an onboard aircraft electronic control system on the first aircraft;

the second end of the electrical engine control line being configured for receipt into a local engine control system on the engine being tested; and a length of the electrical control line being extended to reach between the first aircraft and the engine being tested.

4. The system of claim 3 wherein the fuel conduit and electrical control lines have substantially equal lengths.

5. The system of claim 3 wherein the fuel conduit and electrical control lines are included in a kit.

6. Method of testing an aircraft engine, an engine subject to test existing in an environment lacking full functional support from at least one onboard aircraft system, the method comprising:

connecting at least one local engine system on the engine to be tested with at least one functional reciprocating system on a master aircraft;

operating the engine using the at least one functional reciprocating system;

accomplishing the connecting step by extending a conduit from the local engine system to the functional reciprocating system on the master aircraft; and selecting a fuel delivery system as the functional reciprocating system, and a fuel receiving system as the local engine system; and selecting a main fuel supply system as the fuel delivery system, and a main fuel receiving system as the fuel receiving system.

7. The method of claim 6 comprising:

selecting a motive fuel supply system as the fuel delivery system, and a motive fuel supply receiving system as the fuel receiving system.

8. The method of claim 6 comprising:

selecting an onboard electronic engine control arrangement and main and motive fuel delivery systems as the at least one functional reciprocating system on a master aircraft;

connecting the onboard electronic engine control arrangement on the master aircraft with a local electronic control system on the engine to be tested; and connecting the main and motive fuel delivery systems on the master aircraft into main and motive fuel receiving systems on the engine to be tested.

9. A system for testing an aircraft engine, the system comprising:

a main fuel conduit and a motive fuel conduit;

a first end of both the main and motive fuel conduits configured to connect into an engine fuel delivery system existing on a first aircraft;

a second end of the main fuel and motive fuel conduits configured to connect into an engine fuel intake on an aircraft engine being tested, the aircraft engine being tested not being associated with the first aircraft;

the main and motive fuel conduits being elongated to interconnect the engine fuel delivery system on the first aircraft and the engine fuel intake on the aircraft engine being tested;

a first electrical engine control line having first and second ends;

the first end of the first electrical engine control line being configured for receipt into an onboard aircraft electronic control system on the first aircraft;

the second end of the first electrical engine control line being configured for receipt into a local engine control system on the engine being tested; and a length of the first electrical engine control line being extended to reach between the first aircraft and the engine being tested.

10. The system of claim 9 wherein the main and motive fuel conduits are bound together along at least a portion of a length of the conduits.

11. The system of claim 9 comprising:

an air conduit, the air conduit extending between a bleed air system on the first aircraft and an air intake on the aircraft engine being tested.

12. The system of claim 9 wherein each of the main and motive fuel conduits and the first electrical engine control line are bundled together.

13. The system of claim 9 wherein each of the main and motive fuel conduits and the electrical control line have substantially equal lengths.

14. The system of claim 9 wherein each of the main and motive fuel conduits and the electrical control line are included in a kit.

15. The system of claim 9 wherein the onboard aircraft electronic control system on the first aircraft includes a first electrical output connector and a redundant electrical output connector and the local engine control system on the second aircraft includes a first electrical input connector and a redundant second electrical input connector, system further comprising:

the first end of the first electrical engine control line being configured for receipt onto the first electrical output connector on the first aircraft;

the second end of the first electrical engine control line being configured for receipt onto the first electrical input connector on the local engine control system on the second aircraft;

a second electrical engine control line having first and second ends;

the first end of the second electrical engine control line being configured for receipt onto the redundant electrical output connector on the onboard aircraft electronic control system on the first aircraft; and the second end of the second electrical engine control line being configured for receipt onto the into the redundant second electrical input a local engine control system on the engine being tested.

16. The system of claim 15 wherein the first and second electrical control lines have substantially equal lengths.

* * * * *